United States Patent [19]

Sorensen

[11] 4,227,739
[45] Oct. 14, 1980

[54] SUNROOF OPENING AND LOCKING DEVICE

[75] Inventor: Norman L. Sorensen, Detroit, Mich.

[73] Assignee: Wisco Corporation, Ferndale, Mich.

[21] Appl. No.: 950,030

[22] Filed: Oct. 10, 1978

[51] Int. Cl.³ .............................................. B60J 7/00
[52] U.S. Cl. .................................... 296/224; 49/394;
49/465; 292/DIG. 5
[58] Field of Search ........... 296/137 B, 137 R, 137 E;
49/394, 465; 292/DIG. 5

[56] References Cited

U.S. PATENT DOCUMENTS

| 2,215,022 | 9/1940 | Votypka | 296/137 E |
| 3,913,971 | 10/1975 | Green | 296/137 B |
| 3,955,848 | 5/1976 | Lutz | 296/137 B |
| 3,974,753 | 8/1976 | Blomgren | 296/137 B |
| 4,005,901 | 2/1977 | Lutke | 296/137 B |
| 4,067,605 | 1/1978 | Green | 296/137 B |

FOREIGN PATENT DOCUMENTS 703868  1/1956  Fed. Rep. of Germany ...... 296/137 R

Primary Examiner—Robert R. Song
Attorney, Agent, or Firm—Basile, Weintraub and Hanlon

[57] ABSTRACT

A removable sunroof panel having a frame extending around an opening in the roof of a vehicle is disclosed. The panel has a pivoted arm assembly which is movable from an overcenter closed position to an overcenter vented position wherein the rear edge of the panel is raised above the roof of the vehicle creating an opening. The rear edge of the panel is moved from its closed to vented position by a 2 part fastener having a releasable latch assembly attached to the frame and the pivoted arm assembly pivoted to the panel. A pivoting link has one end pivotally attached to the arm and the other end pivotally and releasably connected to the releasable latch. Sliding a latch slide in the releasable latch releases the rear edge of the panel from the releasable latch. The front edge of the panel is releasably and pivotally attached to the frame by a pair of spaced apart releasing bayonets attached to the underside of the front edge of the panel which project downward and forward to the underside of the frame where they mate with a recessed member carried by the frame. When in their latched position the bayonets pivot in the recessed member. When the bayonets are unlatched the panel can be moved rearward and removed.

5 Claims, 8 Drawing Figures

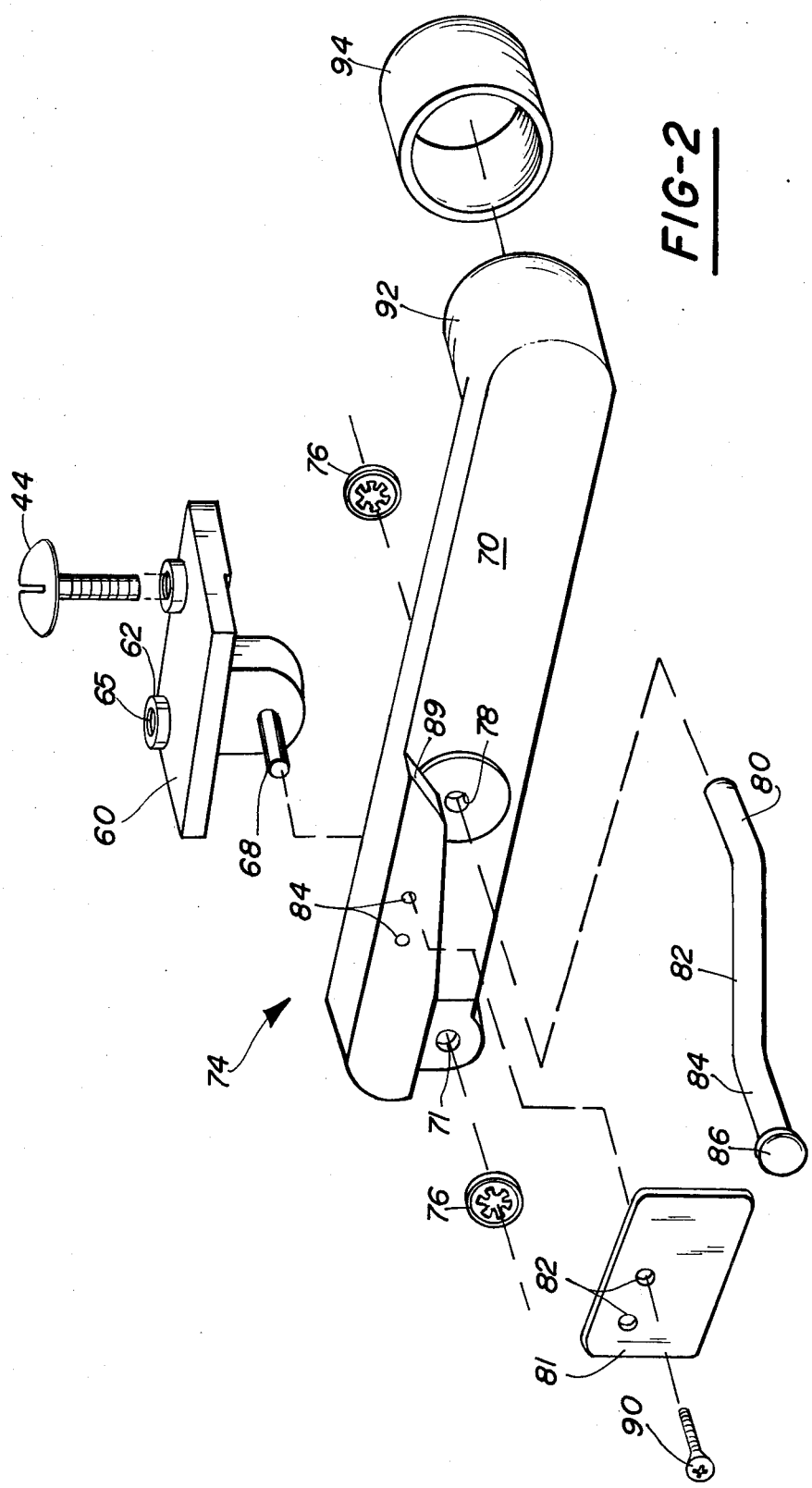

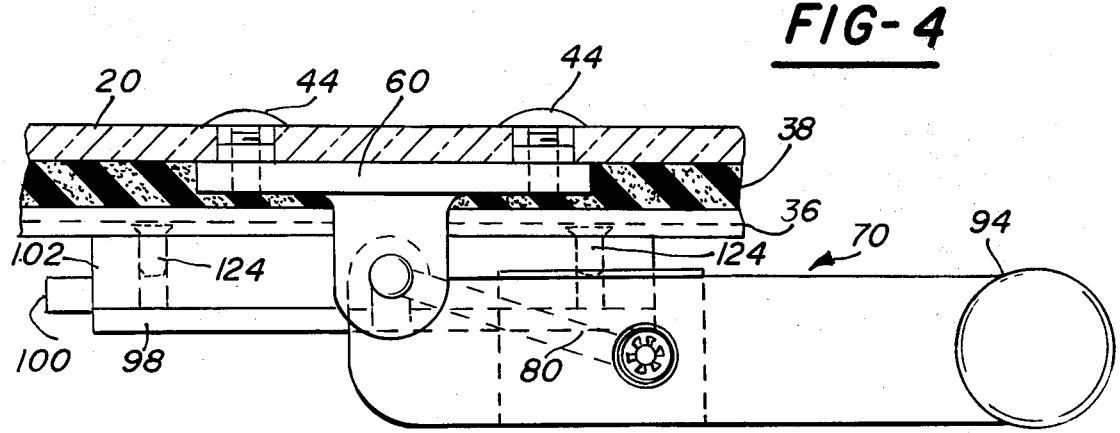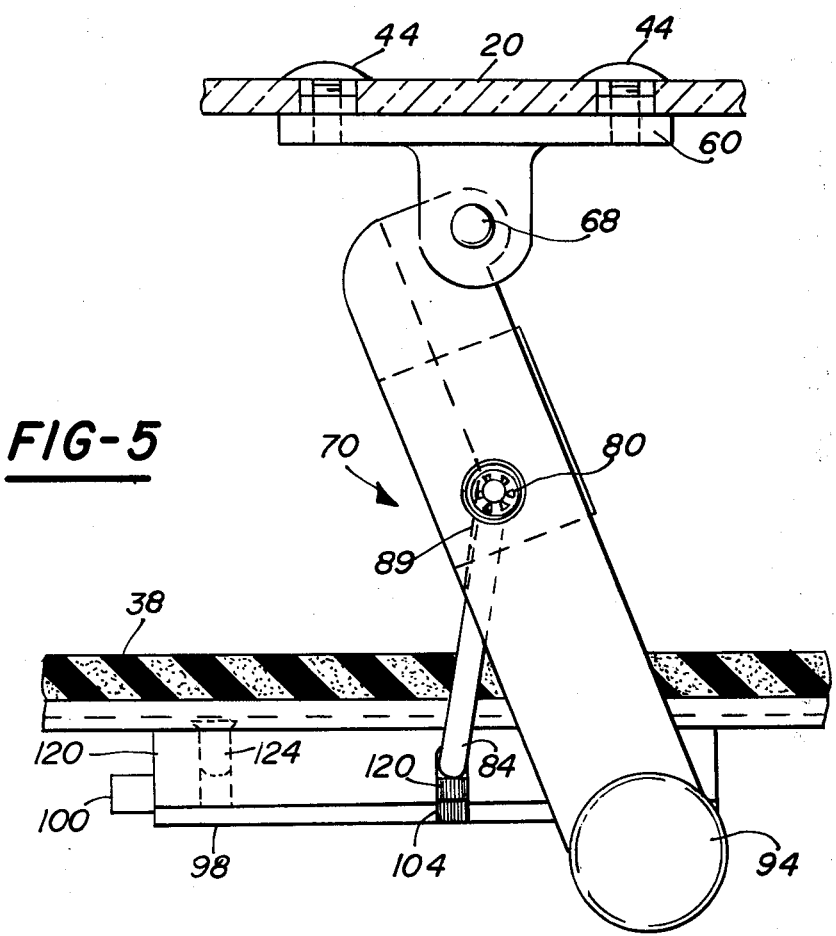

SUNROOF OPENING AND LOCKING DEVICE

BACKGROUND OF THE INVENTION

I. Field of the Invention

This invention relates to the field of removable sunroof panels, and more particularly to an improved two part fastener assembly for supporting the panel in a plurality of operative relationships with respect to the vehicle roof.

II. Prior Art

Pending application Ser. No. 583,260 filed June 3, 1975 entitled "Detachable Sun Roof Panel for Automobiles" discloses an opening in a vehicle roof adapted to receive a removable transparent sunroof panel. The forward end of the panel is retained in the framed opening by a pair of bayonets projecting from the underside of the front edge of the panel and cooperate with a recessed member attached to the front edge of the frame. A two part fastener for the rear edge of the panel includes a handle pivoted about a transverse axis and pivotally connected to the underside of the panel. A tongue pivotally connected to the handle is releasably retained in a lock member in the frame. The handle acts as an over-center linkage to squeeze the panel against the frame in its closed position and in its open position an over-center linkage action holds the panel open with its rear edge tilted away from the frame.

Sunroof structures employing a sliding motion of the panel between a closed position and an open position to cover an opening in the vehicle roof include U.S. Pat. No. 2,215,022.

Other examples of sunroof structures are U.S. Pat. Nos. 3,955,848; 3,913,971; 4,005,901; 3,974,753; 4,067,605; and West German Patentenmeldung No. V7038V/68B.

III. Prior Art Statement

The prior art listed hereinabove includes, in the opinion of the Applicant, the closest art of which the Applicant is aware.

SUMMARY OF THE INVENTION

The present invention is broadly directed toward an improvement in an apparatus for retaining a removable panel within a sunroof opening which allows the panel to either close off the opening or to be supported with its rear edge tilted upwardly, away from the rear edge of the opening, so that the panel is inclined with respect to the plane of the roof.

As will be described hereinafter in greater detail in the following description of a preferred embodiment of the invention, the apparatus includes a frame extending around the pereimeter of the opening. The frame has a novel, resilient molding which functions as a supporting surface, substantially in the plane of the roof, for retaining the edge of the panel. The unique shape of the molding prevents its premature separation from the frame. A pair of recessed members are carried by the frame, below the supporting surface, at spaced points along the forward end of the opening, and are adapted to receive a pair of latching bayonets affixed to the underside of the forward edge of the panel.

A two-part fastener, which separably joins the rear end of the panel to the rear end of the frame, includes a releasable latch member affixed to the underside of the frame. The latch arm for the fastener is pivotally connected to a hinge which is, in turn, pivotally supported on the underside of the rear end of the panel. A pivoting link adapted to be pivotally and releasably retained at one end in the releasable latch member and released by a latch slide, is pivotally attached at its other end to the arm. The arm, the hinge and the link form a three-element linkage which may be disposed in either an overcenter closed position, wherein the arm lies adjacent to the underside of the panel and pulls the panel down against the frame, or in an overcenter extended position, wherein the arm projects upwardly from the frame and supports the rear end of the panel above the frame so that the panel is inclined with respect to the frame in a ventilating position. The overcenter mechanism defined by the arm and pivoting link maintains the fastener in the opened position. To remove the panel, the latch slide is slid transversely releasing the link from the latch, and the front end of the panel is released by releasing the latching bayonets at the forward end wherein the panel may be removed from the frame. The two part fastener includes an open center arrangement in the closed position that prevents the inadvertent opening of the fastener when the arm is first moved into the closed position.

It is therefore an object of the present invention to provide a new and improved sunroof structure which is relatively simple in construction, yet one which is of low cost and is reliable in operation.

Other objectives, advantages and applications of the present invention will become apparent to those skilled in the art of sunroof structures when the accompanying description of one example of the best mode for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a perspective view of the arm mechanism including the pivoted link;

FIG. 4 is a view of the arm as viewed facing the vehicle rear, holding the panel in its closed position;

FIG. 5 is a view of the arm, as viewed facing the rear of the vehicle, with the arm holding the panel in the vented position;

DESCRIPTION OF THE PREFERRED EMBODIMENT

Figure 1:
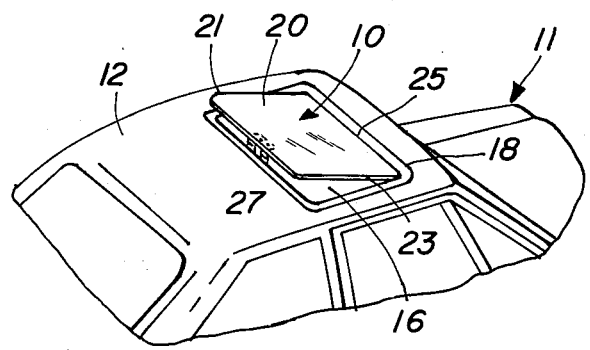
FIG. 1 is a fragmentary, perspective view of an automotive vehicle incorporating a sunroof formed in accordance with the principles of the present invention, with the panel shown in a tilted ventilating position.

Referring now to the drawings and, in particular, to FIG. 1 for one example of the present invention in the form of a sunroof 10 carried by an automobile 11, although it is equally applicable to trucks, vans, recreation vehicles, and the like.

Figure 6:
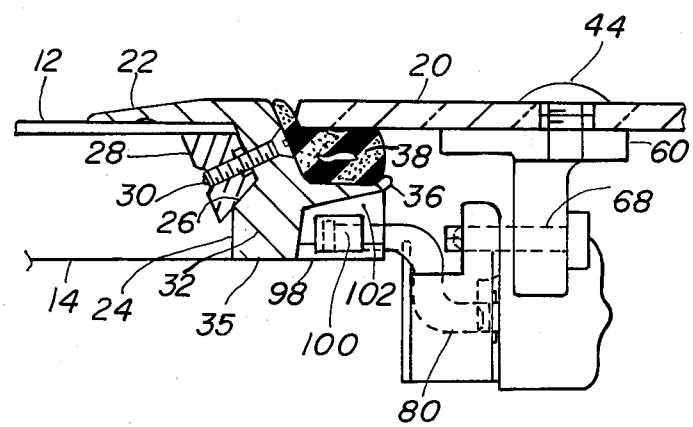
FIG. 6 is a partial sectional view through the panel and vehicle roof and headliner illustrating a side view of the arm in its closed position.

The roof of the automobile 11, is typically formed from an outer sheet metal skin 12 and a headliner 14 (FIG. 6), disposed under the roof sheet skin 12 and spaced inwardly therefrom. In accordance with the present invention, a sunroof opening 16 is formed in the roof, usually over the front seat of the vehicle, and the perimeter of the opening is finished with a frame member 18. The frame is adapted to removably secure a panel 20, preferably formed of a sheet of shatterproof, tempered, tinted glass and having dimensions complementary to the opening 16.

The panel 20 is formed with a gradual curvature across its width so that its concave side faces the frame. Accordingly, the two side edges 21 and 23 are straight, and the forward edge 25 and the rear edge 27 are bowed away from the frame 18. The frame 18 may be level across its width or may have a slight crown, but its curvature should be less than that of the panel 20, so that when the forward edge 25 is first lowered into position against the frame 18, the panel's two side edges 21 and 23 abut the side edges of the frame 18 and the center of the rear edge 27 is slightly raised with respect to the frame 18. In the preferred embodiment of the invention the curvatures of the panel 20 and the frame 18 are such that the center of the rear edge 27 of the panel 20 is separated from the frame 18 by about ⅜ of an inch in this position. The frame 18 includes an extending section 22 (FIG. 6) which overlies the top of the roof sheet skin 12 at the opening 16. A downwardly extending section 24 of the molding has a surface 26 inclined inwardly under the extending section 22 to form a pair of opposed, tapered surfaces adapted to receive tapered wedges 28 which abut the underside of the perimeter of the roof sheet skin 12 to lock the frame 18 to the roof sheet skin 12. The wedges 28 extend along substantial portions of the interface between the frame 18 and the roof sheet skin 12. The wedges 28 are fixed to the frame 18 by threaded fasteners 30. The headliner 14 is attached to the underside of the section 24 by any suitable means, such as an adhesive, or the headliner may be self-supporting and not attached to the frame.

The frame 18 also includes a section 36 cantilevered into the opening 16, below and parallel to the plane of the roof, and retaining a resilient molding 38 on its upper surface.

Figure 7:
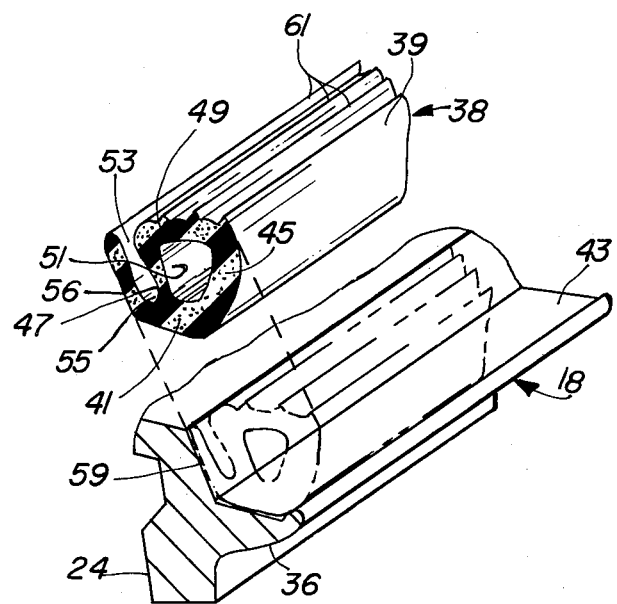
FIG. 7 is a perspective partial sectional view through the resilient molding 38 and the frame 18.

As best can be seen in FIG. 7, the resilient molding 38 comprises an elongated tubular section 39 having a base portion 41 which is seated on the upper surface 43 of the frame cantilevered section 36. The tubular section 39 has upwardly and outwardly inclined integral side walls 45 and 47 which are joined at their upper extremities by top portion 49 to define thereinbetween an air cavity 51. A base portion 53 extends upwardly to approximately the same height as the tubular section 39. The outside surface 56 of the upright flange portion 53 is seated on the inclined wall 59 of the frame 18. The abutting surfaces of the molding 38 and frame 18 are secured to one another by any suitable means, such as an adhesive. The opposing surfaces of the tubular section 39 and the upright flange portion 53 are laterally spaced from each other and define a longitudinal space 55, for a purpose to be described hereinafter. The upper surface of the top portion 49 has a plurality of laterally spaced, longitudinally disposed ridges 61 which are adapted to receive and support the underside of the perimeter of the panel 20. When the panel 20 is in the closed position illustrated in FIG. 6 (and as will be described hereinafter), the tubular section 39 is compressed; however, due to the longitudinal space 55, the constant expansion and compression of the tubular section 39 does not exert any forces onto the flange portions 53 and thus assures that the flange portions 53 will not prematurely separate from the flange wall 59. In the preferred embodiment of the molding 38 is made of a closed cell, neoprene sponge material.

Figure 8:
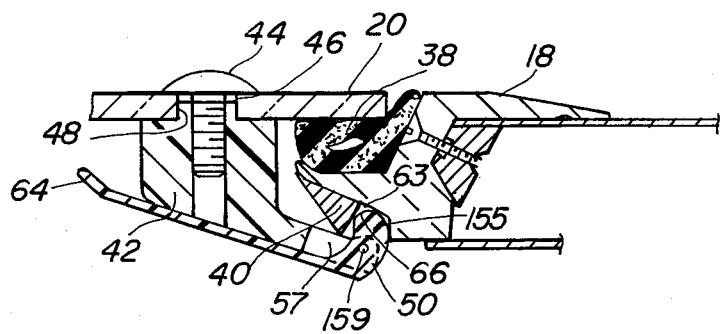
FIG. 8 is cross sectional view through the forward edge of the panel showing the releasing latchable bayonets.

FIG. 8 illustrates a releasable latching bayonet which is more fully described in copending application Ser. No. 949,820 filed Oct. 10, 1978 entitled "Sunroof Forward Edge Latch." A pair of releasable latching bayonet body members are attached to the lower side of the forward edge of the panel 20. Support members 40 are shaped to cooperate with the frame 18 so as to define a pair of recesses 63 which are adapted to cooperate with the pair of extending latching bayonet body members 42 affixed to the underside of the panel 20 at two spaced points on its forward edge. Bayonet bodys 42 are secured to the panel by bolts 44 which extend through holes 46 formed in the panel 20 and mate with internal threads in bosses 48 slidingly fit the holes 46. The bayonet bodies 42 project toward the edge of the panel 20 at a slight, downwardly inclined angle away from the panel and have upwardly right angled bent, enlarged extreme end sections 50. The end section 50 has an open end pocket 57 at its center to receive the pivoted end of a cam 155. The cam 53 has an aperture through its pivoted end. A pair of aligned apertures through the enlarged end section of the bayonet not shown receive a spring pin 159 which is snugly received by the aligned apertures and slidingly passes through the cams aperture forming a pivot for the cam 155. The cam 155 has a projection 66 extending radially outward and upward from the spring pin 159, extending above the enlarged end 50. The lower portion of the cam extends rearward a distance and then widens to equal the width of the bayonet 42, forming an arm 64. The arm 64 of the cam extends rearward in a planar form conforming to the lower surface of the bayonet body 42 extending beyond the rear of the bayonet 42 a distance. In its, first, or engaged position, the arm 64 is against the bayonet body 42 and the projection 66 is extended upward locking the front edge of the panel 20 in position by squeezing the panel 20 against the resilient molding 38. In its second or released position the arm 64 is pointed downward and the projection 66 is retracted into the pocket 57 releasing the squeeze on the resilient molding 38 to allow the panel to be withdrawn. The projection of the cam 66 is received by the support member recess 63 or it is rotated to be disengaged from the recess 63 allowing the removal of the panel.

Referring now to FIG. 2 wherein is illustrated an exploded view of the arm assembly 74 which comprises one part of the two part fastener assembly for elevating and locking the rear edge of the removable panel. The assembly 74 comprises a hinge 60 which is secured to the panel 20 by means of a pair of lugs 62 projection through a mating pair of apertures in the panel 20. The lugs 62 have at their center a pair of threaded apertures 65 mating with a pair of screws 44 to securely fasten the panel 20 to the hinge 60. A hinge pin 68 extends longitudinally rearward a distance to pivotally receive an aperture 71 in the end of the arm 70. A locking collar 76 pressed over the end of the pin 68 securely and pivotally holds the arm 70 to the hinge 60. A aperture 78 near the center of the arm 70 pivotally receives one end of a pivoting link 80 which extends through the arm 70 a distance to tightly receive a locking collar 76 to hold the one end of pivoting link 80 pivotally in place. The center portion of the pivoting link 82 extends at right angles to the first end of the pivoting link and then is bent at a right angle again parallel to and extending away from the first end to form the other end of the pivoting link 84. The other end of the pivoting link terminates at an enlarged portion 86. The arm 70 has a thickened planar portion 89 beginning at its pivoting end which extends to a point beyond the aperture 78. The thickening planar portion 89 of the arm extends from the top of the arm half way down the thickness of the arm. A retainer plate 81 to retain the pivoting link has a pair of apertures 82 therethrough which align with a pair of threaded apertures 84 in the thickened portion of the arm 89. A pair of threaded fasteners 90 securely fasten the plate 81 to the arm 70. A circular projection 92 at the end of the arm 70 forms a knob for grasping and moving the arm with the user's hand. A plastic covering 94 covers the projection of the arm to form a smooth knob surface. The other end of the pivoting link 20 84 and its enlarged end 86 of the pivoting link 80 cooperate with a releasble latch in a manner which will be described more fully herebelow.

Figure 3:
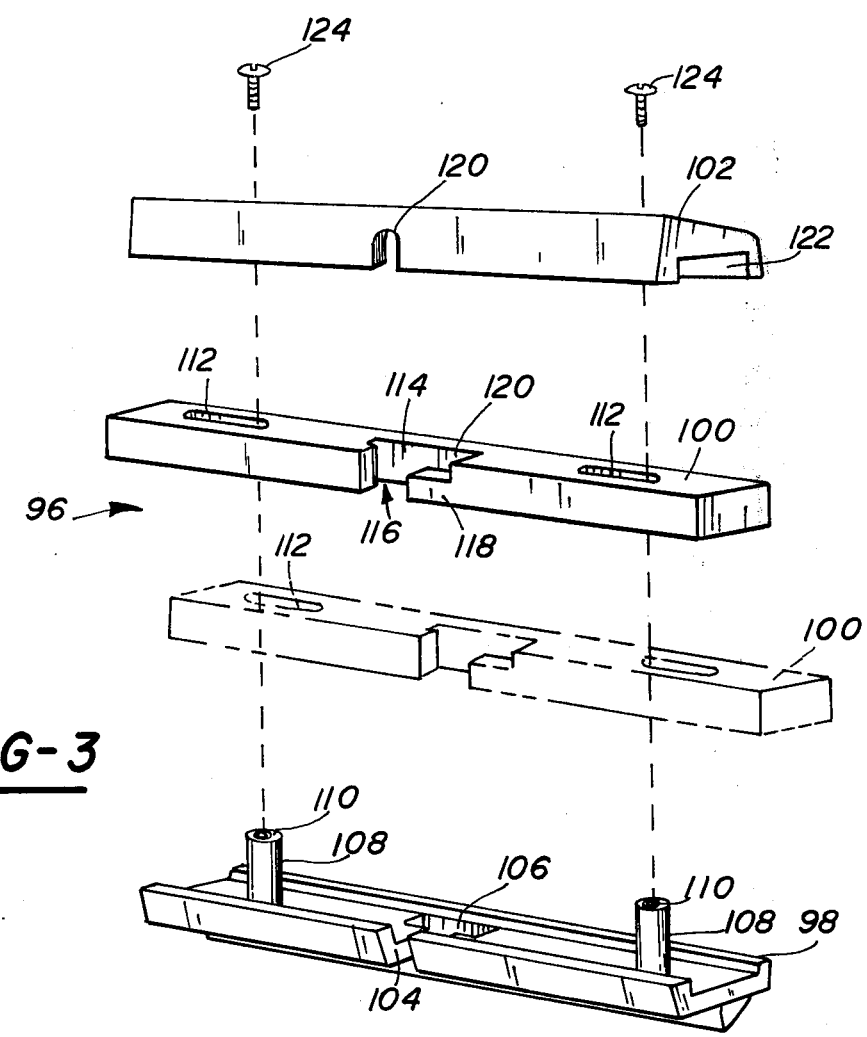
FIG. 3 is a perspective exploded view of the releasable latch mechanism.

Referring now to FIG. 3 wherein there is illustrated an exploded perspective view of the releasable latch 96 comprising a base plate 98 a latch slide 100 and a cover plate 102. The base plate 98 has at its center a vertical slot 104 extending toward the interior where it widens out into a T shaped slot 106. Spaced in from the end of the base plate is a pair of cylindrical projections 108 extending vertically upward a distance. Each projection 108 has disposed at its center a threaded aperture 110. The latch slide 100 has spaced in from its ends a pair of elongated apertures 112 configured to slidingly cooperate with the upright post 108. The elongated slots 112 allow the latch slide to be moved from its first or released position to its second or latched position. A "T" shaped slot 114 at the center of the latch plate is configured to cooperate with the slot 104 and 106 in the base plate so that when the latch slide is in its first or released position a slot 116 aligns with the slot 104 in the base plate 98, and in its second position or latched position a projection 118 forms a wall which extends inward toward the slot 116 a distance to project over the slot 104. An interior slot 120 is configured to not cover the slot 106 when the latch slide 100 is in either its first or its second position. The projection 118 is recessed below the upper surface of the latch slide 100 to provide clearance for the pivoting link when it is in position as will be explained here more fully below. The releasable latch cover 102 has a beveled upper surface to mate with the flange 36 of the frame 18. The lower surface of the cover 102 is recessed 122 along its length to nestingly receive the latch slide 100. A vertical slot 120 is disposed in the center of the cover, part way up its thickness, to slidingly receive the other end 84 of the pivoting link 80. The slot 120 communicates with the recess 122 in the cover 102. The threaded apertures 110 in the base plate 98 align with a pair of mating apertures in the top of the cover 102 and in the flange 36 of the frame 18. A pair of threaded fasteners 124 pass through the apertures in the flange 36 and the cover 103 to engage the threaded apertures 110 and secure the releasable latch to the flange 36.

When the latch slide 100 is in its released or first position the other end 84 and the enlarged end 86 of the pivoting link are insertable into the releasable latch mechanism through the vertical slots 104, 116, and 120.

When the pivoting link is in position the latch slide 100 is slid to its latch position and the pivoting link is pivotally secured to the releasable latch mechanism with the enlarged end 84 retained by the wall of the projection 118.

Referring now to FIG. 4 wherein there is illustrated the two part fastener assembled with the arm 70 in the first or lock position. In this position the hinge 60 exerts a downward force on the panel 20 which squeezes the resilient molding 38 against the flange 36. The arm 70 and the pivoting link 80 are in an over center position holding the knob 94 in an upward position and the arm 70 in a horizontal configuration. In the first or lock position, the latch slide 100 is pushed to the left locking the pivoting link 80 into position.

Referring now to FIG. 5 wherein the mechanism of FIG. 4 has been extended to the second or vent position for the two part fastener. To move the two part fastener mechanism from the first or lock position to the second or vent position the knob 94 is rotated clockwise to an approximate vertical position. Then the hinge 60 and the panel 20 are pushed upward with the arm 70 pivoting about the pin 68 and the first end of the pivoting link 80 and the other end of the pivoting link 84 pivoting about their respective centers until the mechanism reaches an over center position. In the over center position the pivoting link 80 rests against the thickened portion 89 of the arm 70 to hold the panel 20 in the vent position.

To release the rear end of the panel 20 and remove the panel from the opening, the panel is first placed in the vent position as shown in FIG. 5. Then the latch slide 100 is slid to the right to its second or released position. The wall of projection 118 is retracted and the pivoting link 80 is pulled through the apertures 120 and 104 releasing the ends 84 and 86 of the pivoting link. The arms 64 of the cams 53 are pushed downward to release the bayonets at the front end of the panel 20. The panel can then be displaced rearward a short distance and removed from the opening.

Having thus described my invention, what I claim is:

1. A two-part separable fastener for joining one edge of a sunroof panel to a section of a frame extending about an opening in a vehicle roof comprising:
    an arm having an over-center action pivotally supported to the underside of the panel adjacent an edge thereof, and a pivoting link pivoted at one end to an intermediate portion of the arm and releasably pivoted at the other end to a transversely actuated releasable latch supported by the frame.

2. The two-part separable fastener as defined in claim 1 wherein said arm further comprises:
    a hinge fixedly attached adjacent an edge of the panel;
    a hinge pin extending from the hinge;
    the arm having at one end a first aperture to pivotally receive the hinge pin, a first retainer collar pressed over the end of the hinge pin to hold the arm in place;
    a second aperture at the intermediate portion to pivotally receive one end of a pivoting link, a second retainer collar pressed over the one end of the link to hold said one end of said pivoting link in place;
    said pivoting link bent at a right angle where it emerges from said second aperture and further along its length bent at a right angle again pointing away from the arm to form the other end, the other end including an enlarged portion;

said other end releasably pivoted to said releasable latch supported by the frame;

a thickened planar portion for said arm extending between said first and second apertures for half the width of the arm; and a retainer plate secured to the thickened portion by a pair of threaded fasteners passing through a pair of apertures in the plate which align with a pair of threaded apertures in the thickened portion, said retainer plate providing a recess below the thickened portion.

3. The two-part separable fastener as defined in claim 1 wherein said releasable latch comprises:

a base plate having a vertical slot having a width to slidingly receive the other end of the pivoting link, the slot widening longitudinally at the interior to receive the enlarged portion of the pivoting link, a pair of cylindrical upright projections spaced in from the end of the base plate having at their center a threaded aperture;

a latch slide having a pair of elongated slots disposed longitudinally and spaced in from the ends to slidingly receive the cylindrical projections and allow the latch to be slid longitudinally, a second vertical slot at its center aligned to allow the other end of the pivoting link to pass through the first vertical slot and the second vertical slot when the slide is in its first position, when the slide is in its second position the second vertical slot is not over the first vertical slot, and a projecting wall of the slide covers the top of the first vertical slot, the interior of the second vertical slot widens longitudinally internally to provide clearance for the enlarged portion when the slide is in its first position or second position;

a cover having a longitudinal recess in its bottom wall to slidingly receive the latch slide;

a third vertical slot passing part way up the thickness of one edge aligned to slidingly receive the other end of the pivoting link disposed above the first vertical slot and communicating with the recess;

the projecting wall is reduced in thickness to clear the diameter of the other end of its pivoting link when the other end is in the third vertical slot and the latch slide is slid to its second position; and a pair of apertures in the cover aligned with the threaded aperture sized to receive a pair of mating threaded fasteners.

4. The two-part separable fastener as defined in claim 2 wherein:

said thickened portion terminates in a position to support the pivotal link in an over-center position.

5. The two-part separable fastener as defined in claim 1 wherein said releasable latch comprises:

an opening to receive the enlarged portion; and a slide means to retain the rod and prevent removal of the enlarged portion.

* * * * *